(12) United States Patent
Kenitzer

(10) Patent No.: US 12,011,119 B2
(45) Date of Patent: Jun. 18, 2024

(54) DEBRIS AND LIQUID CATCH APPARATUS AND METHODS USING THE SAME

(71) Applicant: Larry Kenitzer, Clovis, CA (US)

(72) Inventor: Larry Kenitzer, Clovis, CA (US)

( * ) Notice: Subject to any disclaimer, the term of this patent is extended or adjusted under 35 U.S.C. 154(b) by 794 days.

(21) Appl. No.: 16/591,611

(22) Filed: Oct. 2, 2019

(65) Prior Publication Data

US 2020/0029744 A1    Jan. 30, 2020

Related U.S. Application Data

(63) Continuation-in-part of application No. 14/845,562, filed on Sep. 4, 2015, now abandoned.

(51) Int. Cl.
| | |
|---|---|
| *A47J 47/16* | (2006.01) |
| *A47G 21/14* | (2006.01) |
| *B32B 7/09* | (2019.01) |
| *B32B 7/12* | (2006.01) |

(52) U.S. Cl.
CPC .............. *A47J 47/16* (2013.01); *A47G 21/14* (2013.01); *B32B 7/09* (2019.01); *B32B 7/12* (2013.01)

(58) Field of Classification Search
CPC . A47J 47/16; A47G 21/14; B32B 7/09; B32B 7/12
See application file for complete search history.

(56) References Cited

U.S. PATENT DOCUMENTS

| | | | | |
|---|---|---|---|---|
| RE25,675 E | * | 11/1964 | Bonnett | A47L 13/18 428/102 |
| 5,972,470 A | * | 10/1999 | Engst | C09K 3/32 428/140 |
| 6,047,938 A | * | 4/2000 | Mitchell | A47G 23/0316 211/49.1 |
| 6,458,442 B1 | | 10/2002 | McKay | |
| 7,024,721 B2 | * | 4/2006 | McKay | A47L 13/46 428/68 |
| 7,654,227 B1 | | 2/2010 | Yananton | |
| 9,427,723 B2 | * | 8/2016 | Woytowich | B01J 20/24 |
| 10,660,502 B2 | * | 5/2020 | Caldas | B32B 7/06 |
| 10,716,455 B1 | * | 7/2020 | Bookland | B32B 27/08 |
| 2005/0008853 A1 | | 1/2005 | Foote | |
| 2012/0030890 A1 | | 2/2012 | Diener | |
| 2012/0312952 A1 | | 12/2012 | Girmscheid | |
| 2017/0065115 A1 | * | 3/2017 | Kenitzer | A47L 19/00 |

FOREIGN PATENT DOCUMENTS

WO    WO-2008133473 A1 * 11/2008  ............. A47G 21/14

OTHER PUBLICATIONS

"Basal Area A guide for understanding the relationship between pine forests and wildlife habitat", Mississippi Wildlife, Fisheries, & Papers, date retrived Nov. 29, 2016.

* cited by examiner

*Primary Examiner* — Patricia L. Nordmeyer
(74) *Attorney, Agent, or Firm* — Sierra IP Law, PC; William K. Nelson

(57) ABSTRACT

The present invention provides an apparatus for preventing the spread debris and collecting liquids from the surface of handheld tooling. The apparatus of the present invention is operable to provide a sanitation pad comprised of a plurality of peelable units which are capable of absorbing liquids (e.g., water, and oils) and collecting debris for preventing contamination to the immediate work environment. The units may be comprised of various layers and material thereby allowing for various handheld tooling applications.

19 Claims, 4 Drawing Sheets

DEBRIS AND LIQUID CATCH APPARATUS AND METHODS USING THE SAME

FIELD OF THE INVENTION

The present invention generally relates to a utensil rest and sanitation pad, and, more specifically, a sanitation pad with a plurality of absorbent, removable, and disposable sheets. More particularly, the present invention relates to handheld tools.

DISCUSSION OF THE BACKGROUND

Utensil and tools are used to accomplish various tasks, and this often results in a collection of contaminants such as, dirt, debris, food, and liquid on the surface of the tool. The tools are often set down temporarily during use, which can result in the spread of contaminants in the surrounding work environment. This can lead to a lengthy cleaning process to clean the work area after completing the task. Thus, it is advantages to prevent the spread of debris and liquid in the work area. Tool rests are used to contain the spread of contaminants, and temporarily store a tool when the tool is not in use. However, tool rests and holders often become fouled with a buildup of contaminants and no longer serve to prevent the spread of contaminants.

Tools used in a liquid retain a residue of moisture on the surface of the tool due to the adhesion properties and viscosity of the fluid. Conventional methods in resolving this such issues have been developed in the form of a tool holder, for temporary storage. Tool holders are often composed of ceramics, metallic, and silicon materials; these materials are sufficient in containing a liquid as they are non-porous, but fluids and various debris are transferred to the tool holder and are typically retained in the cavity of the holder. Cleaning of conventional tool holders is typically required after every use.

Accordingly, an improvement for utensil hold technology is needed, a structure that is capable of absorbing excess liquids and prevents contamination of the surrounding area. This will help the user keep their work area and utensil's clean.

SUMMARY OF THE INVENTION

The present invention provides an apparatus for temporary storing a tool and containing debris gathered from the tool usage. The apparatus may include a plurality of disposable and, in some examples, biodegradable units. The units may be operable to absorb liquids and collect fragments and residue left on the surface of the tool. The plurality of units are connected and removably stacked to form a sanitation pad that may be used multiple times without accumulating liquids and debris.

It is the object of the present invention to provide a solution for the disadvantages of utensil holders and temporary tool storage. A utensil holding apparatus, according to the invention, is designed to be placed on a kitchen countertop, workbench, or other surface near the user, and support a tool for easy retrievability. The utensil holding apparatus may hold and support a sanitation pad comprising a plurality of pad units.

The utensil holding apparatus may include a plurality of pad units that are stacked together to form a sanitation pad, in which each unit is removable from the sanitation pad and soiled pad units may be disposed of once the utensil no longer needs temporary storage. In some embodiments, the stack of units may be operable for placement in a fixture (holding apparatus), where the units may have a geometric shape that may nested and/or rest in the structure of the fixture (e.g., the stack of units may have a complementary shape to a recess in the fixture).

A pad unit may be designed to have at least two layers. The two layers may be categorized as an absorbent layer and a base layer. The absorbent layer is operable to absorb a liquid and may be in direct contact with the tool when the tool set on the pad. The absorption layer may be comprised of a material operable to collect a liquid and gather solid fragments on the surface thereof. The absorbent layer may comprise, e.g., a material with properties that are operable for collecting moisture. The material may have a porous surface which is operable to retrieve debris from the surface of the utensil. Materials, for example, without limitation, may include a wood fiber textile, cotton, cellulose-based materials (rayon, lyocell), bamboo, hemp, an absorbent polymer, and the like or a combination thereof. Such materials are highly absorbent of polar liquids (e.g., water-based liquids), and may be capable of swelling to absorb many times the fiber's weight in aqueous fluids. In the case of a wood fiber materials, cotton, bamboo, hemp, or other plant material, the absorbent layer may be biodegradable.

In some embodiments, the absorbent layer may be operable for absorbing nonpolar chemical liquids which are hydrophobic and lipophilic, in such embodiments the materials that may comprise the absorbent layer may include, as an example, without limitation, various microporous and nano-porous thin films, a polyurethane foam, or a composite of all the materials.

In further embodiments, the absorbent layer may include both hydrophilic and hydrophobic materials (a "hybrid" layer), such that absorbent layer may wick both hydrophilic liquids such as water and aqueous materials (e.g., aqueous cleaning solutions, sauces for foods, etc.) and hydrophobic liquids (e.g., engine oils, cooking oil, etc.) from the tool or implement placed on the sanitation pad. In such embodiments, the hydrophilic and hydrophobic materials may be arranged in a pattern that allows hydrophilic and hydrophobic liquids to be absorbed in different areas of the absorbent layer, such that they are separated and can more easily be absorbed. For example and without limitation, the hydrophilic material may be strands, cords, or other fibrous material of cotton, hemp, hydrophilic polymeric material (e.g., polyacrylamide, polyurethanes, poly-(hydroxyethyl methacrylamide), polyethylene glycol derivatives, polyvinylpyrrolidone (PVP), or others) or other hydrophilic materials arranged in hydrophilic bands, and the hydrophobic material may be strands, cords, or other fibrous material of polyester, polyurethane or other hydrophobic polymeric material, a material coated in a hydrophobic layer (e.g., silica nano-coating—alcohol suspensions of $SiO_2$ nanoparticles), or other hydrophobic materials arranged in hydrophobic bands, where the hydrophilic and hydrophobic bands are arranged in a pattern, such as alternating hydrophilic and hydrophobic bands (e.g., like stripes).

In further embodiments, the absorbent layer may include an upper porous layer having a porous membranous structure (e.g., having pores therein with a pore size in a range of about 0.5 mm to about 2 mm) operable to allow fluids to flow into an underlying absorbent hydrophilic layer, hydrophobic layer, or a layer including hydrophilic and hydrophobic materials (hybrid layer). The hydrophilic and/or hydrophobic fluid may pass through the upper porous layer and wick onto the underlying absorbent layer. In further embodiments, the absorbent layer may include an upper porous layer and two or more underlying absorbent layers to allow the pad unit to collect and store more fluid.

The base layer may be impermeable to liquids, and operable to connect with and hold in place the absorbent layer. Additionally, an adhesive may be applied to the base layer (e.g., the basal portion thereof, the basal portion being the face of the base layer in contact with the resting surface and opposite to the absorbent layer). The resting surface may be a countertop, bench top, garage floor, or other surface near a work or cooking area. In some embodiments, the resting surface may be the fixture on which the sanitation pad is placed. A base layer may be of a material with properties that are operable to prevent the permeation of aqueous liquids such as a hydrophobic polymeric material, a pasteboard or other wood-pulp based material having a sufficient thickness to be rigid or semi-rigid wood and coated in a hydrophobic layer (e.g., silica nano-coating—alcohol suspensions of $SiO_2$ nanoparticles), a hydrophobic polymer (e.g., polyester, polyurethane, etc.) or other hydrophobic rigid or semi-rigid materials. In some embodiments, the base layer may include a rigid or semi-rigid material that is impermeable to hydrophilic or hydrophobic liquids, such as a semi-rigid (flexible) material comprising a wood-pulp based material (e.g., pasteboard, etc.), a semi-rigid polymeric material, or other sufficiently rigid material having a liquid impermeable or resistant coating, such as a ceramic (e.g., silica, or other ceramic), polymeric coating (e.g., ethylene propylene diene monomer rubber), or other coating that is impermeable or resistant to flow of hydrophilic and hydrophobic liquids.

In another embodiment, a unit may be comprised of three layers, where the top layer is a coarse fibrous material which traps debris on the surface of the sanitation pad but allows for liquids to permeate the layer. The liquid flows to the absorbent layer, which may be composed of highly absorbent materials, for example, without limitation, an absorbent polymer, cotton, bamboo, and hemp, or may be a combination of the aforementioned. The base layer is composed of a hydrophobic top layer, a thin layer of liquid-impermeable plastic, and an adhesive base layer. In some embodiments, the base layer is operable to surround the absorbent layer and prevent the flow of contaminants from the absorbent layer, sequestering them therein. The base layer adhesive may be operable to attach to the top upper layer of the sanitation pad.

In some embodiments, the utensil holding apparatus may be framed with a rigid structure to support a utensil; the framed rigid structure may be operable to receive a plurality of units which form a sanitation pad and may be constructed of rigid materials such as, without limitation: ceramics, polyurethane, plastics, cardstock, and wood. In other embodiments, the utensil holding apparatus is rigid and could be metal wood or glass. It is an object of the present invention to support a utensil or tool.

EXEMPLARY EMBODIMENT

It is another object of the present invention to provide an absorbent sanitation pad; a sanitation pad may typically comprise a first porous and liquid-permeable top layer, a highly absorbent hydrophilic material in the intermediate layer, and a hydrophobic and impermeable base layer. The permeable top layer may be composed of, a mixture of wood fiber textiles, and cellulose (cotton, rayon, lyocell). The highly absorbent intermediate layer for absorbing polar liquids (e.g., water-based liquids), may be of highly absorbent material (e.g., carboxymethyl cellulose, wood fiber, etc.) which may be capable of swelling to absorb many times the fiber's weight in water. In embodiments which absorb nonpolar liquids (e.g., crude oil, automotive oil) polymer sponges are of a hydrophobic material and are used to absorb highly viscous fluids such as automotive and crude oils. The base layer may be typically composed of plastic and vinyl group, which is impermeable to liquids.

It is an object of the present invention to prevent the contamination of the working area with debris and liquid.

It is an objective of the present invention to provide a plurality of disposable units which are highly absorbent.

It is further the object of the present invention to decrease the time required to clean a working area.

Additional aspects and objects of the invention will be apparent from the detailed descriptions and the claims herein.

DETAILED DESCRIPTION

Figure 1:
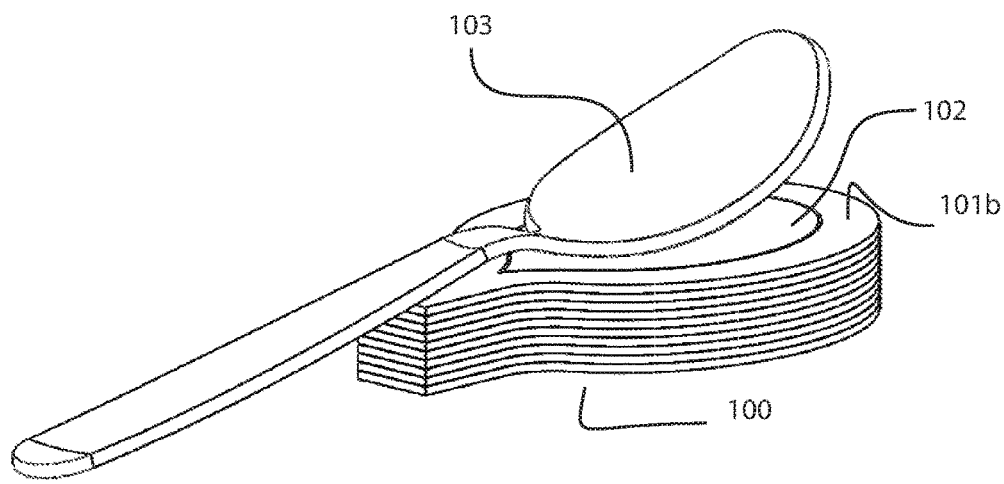
FIG. 1 shows an environmental perspective view of an embodiment according to the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1-8, it is seen that the present invention includes various embodiments of a debris and liquid catch apparatus, and methods of using the same.

Without limiting the invention, FIG. 1 shows an environmental perspective view of an apparatus operable for temporarily supporting a utensil 103 and an apparatus for preventing the spread of debris in a cooking or work area. The apparatus may be comprised of a plurality of units 100*a* which are stacked forming a sanitation pad 100. The sanitation pad 100 may be placed on a surface and is operable for supporting the sanitation pad 100 and the utensil 103. Each unit of the sanitation pad 100 may comprise a base layer 101 and an absorbent layer 102. The base layer 101 may further comprise two components: a basal layer 101a and an upper base layer 101b. The absorbent layer 102 may be operable to support a utensil 103 and collect excess debris and/or fluid from the utensil's usage. The basal layer 101a is further operable to corral liquids and prevent the spread from the surface of the utensil 103 and the absorbent layer 102. The plurality of units may be joined together using an adhesive applied, e.g., to the top surface of the upper base layer 101b. The adhesive may be sufficient strong to maintain the units of the sanitation pad 100 as a single cohesive unit, while still allowing a single unit to be peeled off the sanitation pad 100 by a human user.

Figure 2:
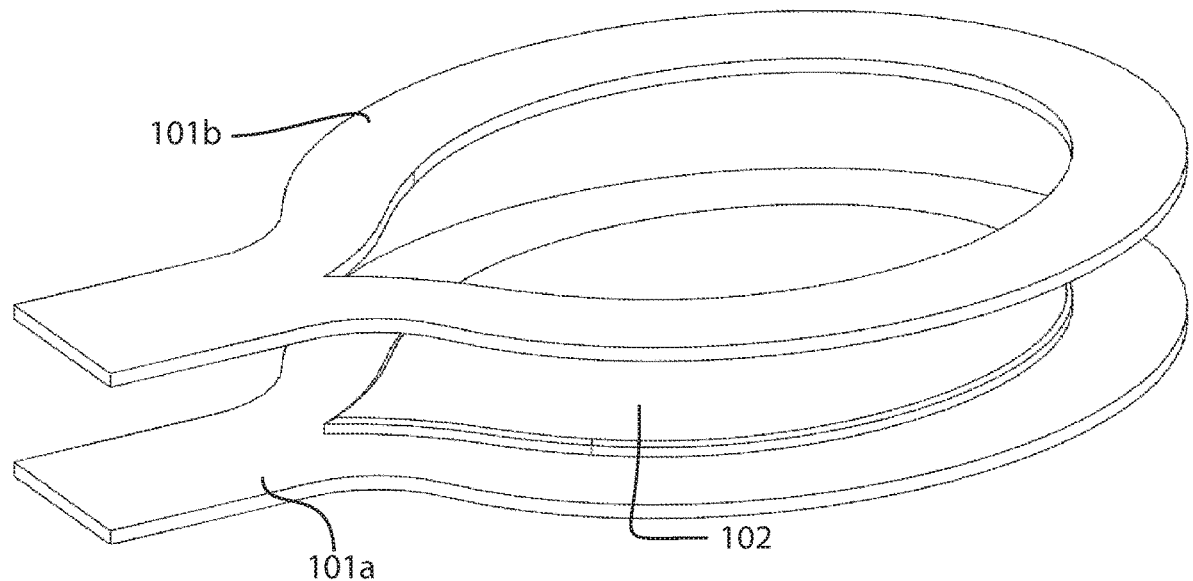
FIG. 2 shows an exploded view of an embodiment of the apparatus according to the present invention.

FIG. 2 shows a perspective exploded view of a single unit 100a of the sanitation pad 100, the apparatus comprised of two general units: a base layer 101 and an absorbent layer 102. The base layer 101 may comprise a basal layer 101a and an upper base layer 101b. The basal layer 101a and upper base layer 101b may be manufactured from materials that are rigid or semi-rigid, such that the base layer provided structure and shape to the unit 100a. In some embodiments, the basal 101a and/or the upper base layer 101b may be hydrophobic, and operable to contain any liquid collected from the instrument 103 within the absorbent layer 102.

The absorbent layer 102 may be attached to the basal layer 101a using an adhesive that is not water-soluble. The basal layer 101a and upper base layer 101b may be joined together using an adhesive; the adhesive type may vary as a dependent on the specific materials used. The absorbent layer 102 may be of a material operable for absorbing liquids, particularly polar liquids. In some embodiments, the base layer 101 may be of a biodegradable material, such as a cardstock, pasteboard, or other wood pulp based material or a biodegradable plastic (e.g., polyhydroxyalkanoates, polylactic acid, cellulose-based plastics, or other biodegradable plastic materials). In some embodiments, the basal layer 101a may be attached to the absorbent layer 102 using stitching.

Figure 3:
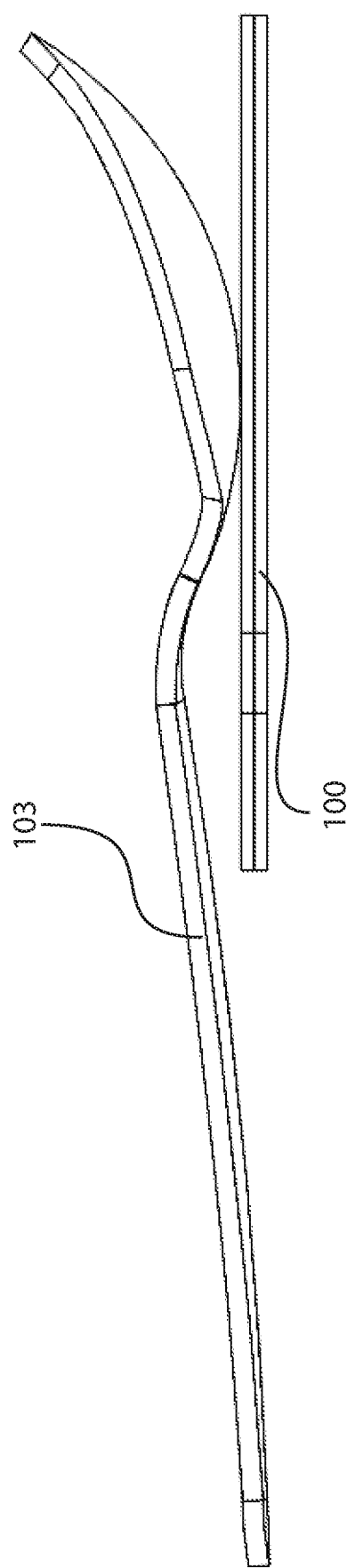
FIG. 3 shows a side view of an embodiment of the apparatus according to the present invention.

FIG. 3 shows an environmental side view of a single unit of the sanitation pad 100. A portion of the utensil 103 (e.g., a handle) may rest on the surface supporting the sanitation pad 100. A surface, as an example, without limitation, may be a kitchen countertop, workbench, and eating area.

Figure 4:
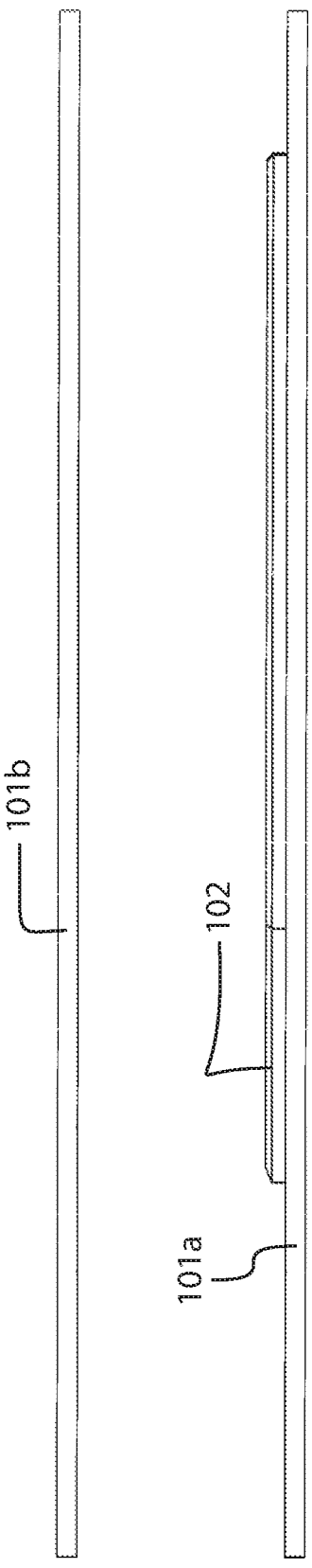
FIG. 4 shows an exploded side view of an embodiment of the apparatus according to the present invention.

FIG. 4 shows an exploded side view of the apparatus of FIG. 1, the basal surface 101a and the absorbent layer 102 may be bonded together with an adhesive. The upper base layer 101b may be positioned over the absorbent layer 102 and may be adhered to both the outer edge of the absorbent layer 102 and the basal layer 101a to sandwich the absorbent layer 102 between the basal layer 101a and upper base layer 101b to secure it in place. In some embodiments, and without limitation, the absorbent layer 102 and the upper base layer 101b may have about the same thickness, which may allow the top surface of the absorbent layer 102 and the upper base layer 101b to be flush when the structures are bonded. In other embodiments, the absorbent layer may have a thickness which is greater than the upper base layer.

Figure 5:
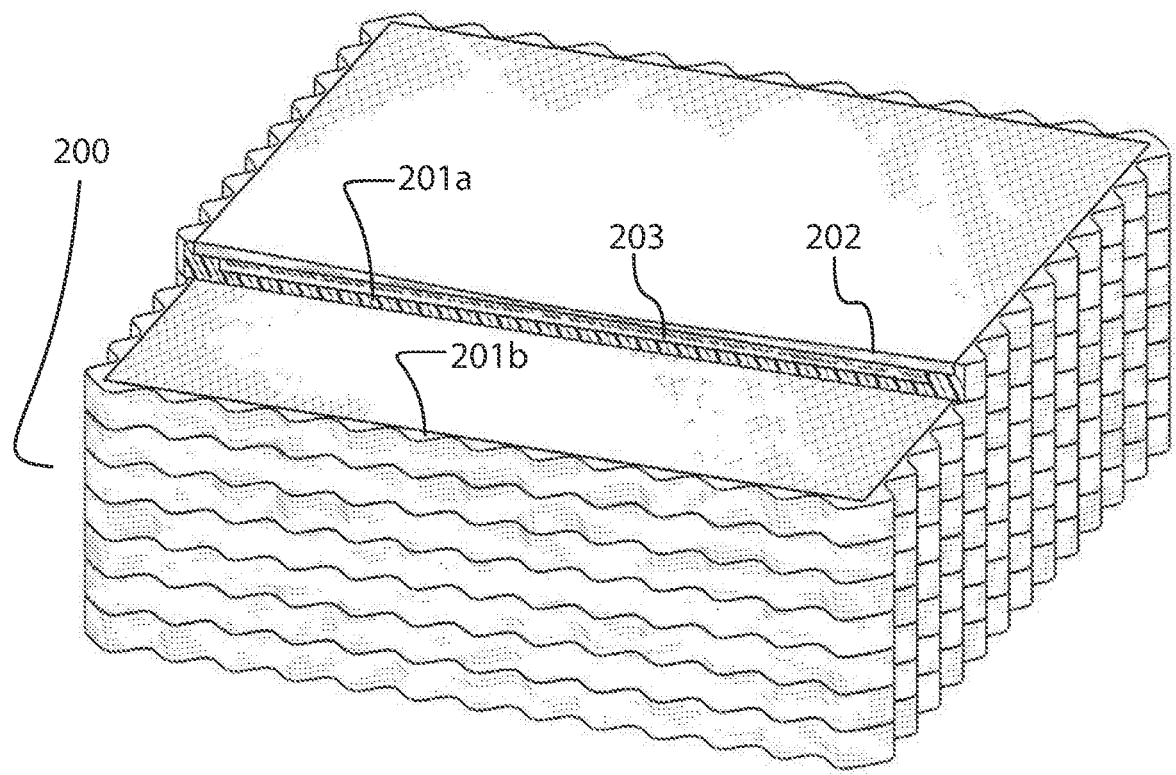
FIG. 5 shows a trimetric perspective view with a cross-sectional view of a unit from an embodiment of the present invention.

FIG. 5 shows another embodiment of an apparatus operable for temporarily supporting a utensil and preventing the spread of debris in a work area, apparatus. The apparatus may be comprised of a plurality of units forming a sanitation pad 200. A single unit 200a may comprise a base layer 201a, absorbent layer 203, and a top layer 202. The base layer 201a may have a geometry operable for nesting both the absorbent layer 203 and the top layer 204 with the body itself. The absorbent layer 203 may be operable for absorbing liquids and may have a material that swells in volume when collecting the liquid. The top layer 202 may include a porous material operable for catching dirt and allowing the permeation of liquids through the medium of the material. The base layer 201a material may include a flexible biodegradable material (e.g., a bio-degradable plant-based material, such as a wood-pulp based product, or a bio-degradable polymeric material). The base layer 201a may also be hydrophobic and impermeable to fluids. The rim of the base layer 201a may have an adhesive applied on the lower surface to attach to the rim of the underlying base layer 201b in the stack of units 200a.

In some embodiments, the absorbent layer 203 may include a material of the hydrophilic type for absorbing polar fluids. In other embodiments, the absorbent layer 203 may include a hydrophilic material, such as wood pulp composite, cotton, bamboo, hemp, and a hydrophobic material, such as polyester, polyurethane, fibers coated in a hydrophobic material (e.g., silica nano-coating—alcohol suspensions of $SiO_2$ nanoparticles) for absorbing hydrocarbons (e.g., automotive oils) which may drip from tooling.

Figure 6:
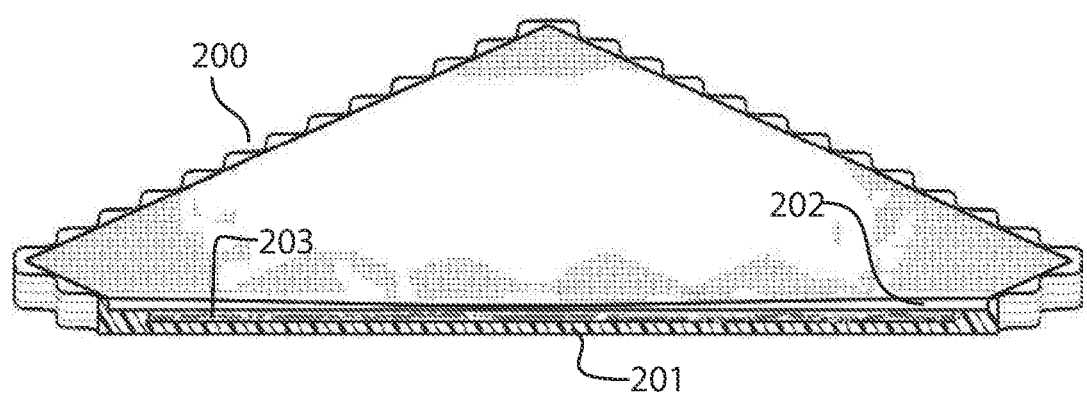
FIG. 6 shows a cross-sectional perspective view of a unit of an embodiment of the apparatus according to the present invention.

FIG. 6 shows a perspective view of a single unit of the pad of the apparatus of FIG. 5, the single unit 200a may be peeled off the pad and is operable to be used without being attached to the pad. The individual unit may include a base layer 201, absorbent layer 203, and a top layer 202. The materials and material properties are in the same as that of FIG. 5. The base layers 201, absorbent layer 203, and top layer 202 are attached using an adhesive. The adhesive may be insoluble to liquids. In some embodiments, the layers may be attached using stitching.

Figure 7:
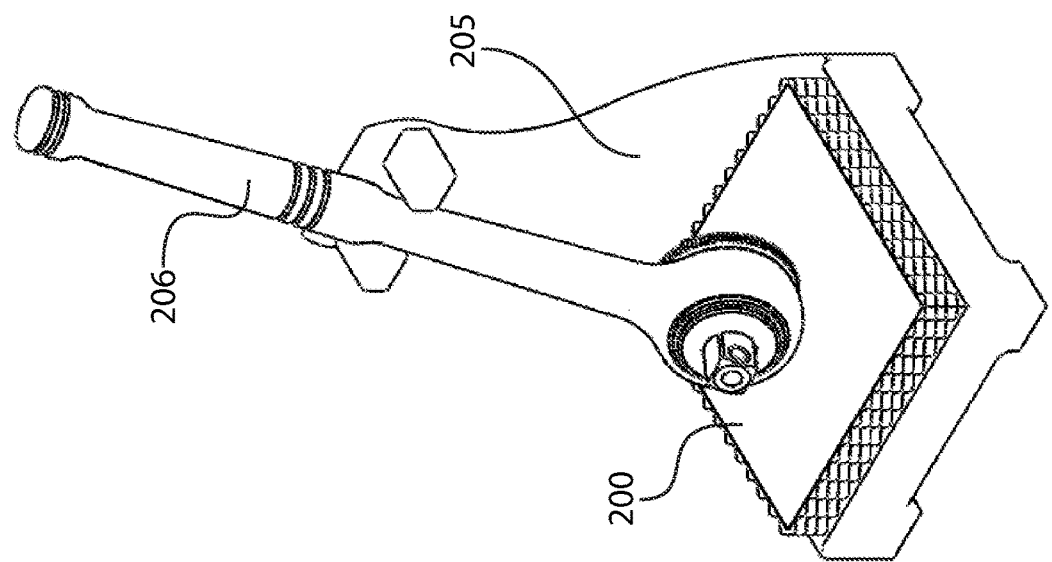
FIG. 7 shows an environmental trimetric perspective view of an embodiment of the apparatus according to the present invention.

FIG. 7 shows an environmental perspective view of sanitation pad 200 nested in a housing or dispensing structure 205. The structure 205 may be operable for supporting a tool 206, and may be capable of receiving the sanitation pad 200. The structure 205 may have a geometry complementary to that of the sanitation pad 200. The structure 205 may be constructed of various materials (e.g., ceramic, plastics, wood, etc.) and may further be operable for supporting the tool 206 in an upright position allowing for gravity to assist the fluid from the surface of tool 206 to travel to the top layer 202 of the first unit of the sanitation pad 200.

Figure 8:
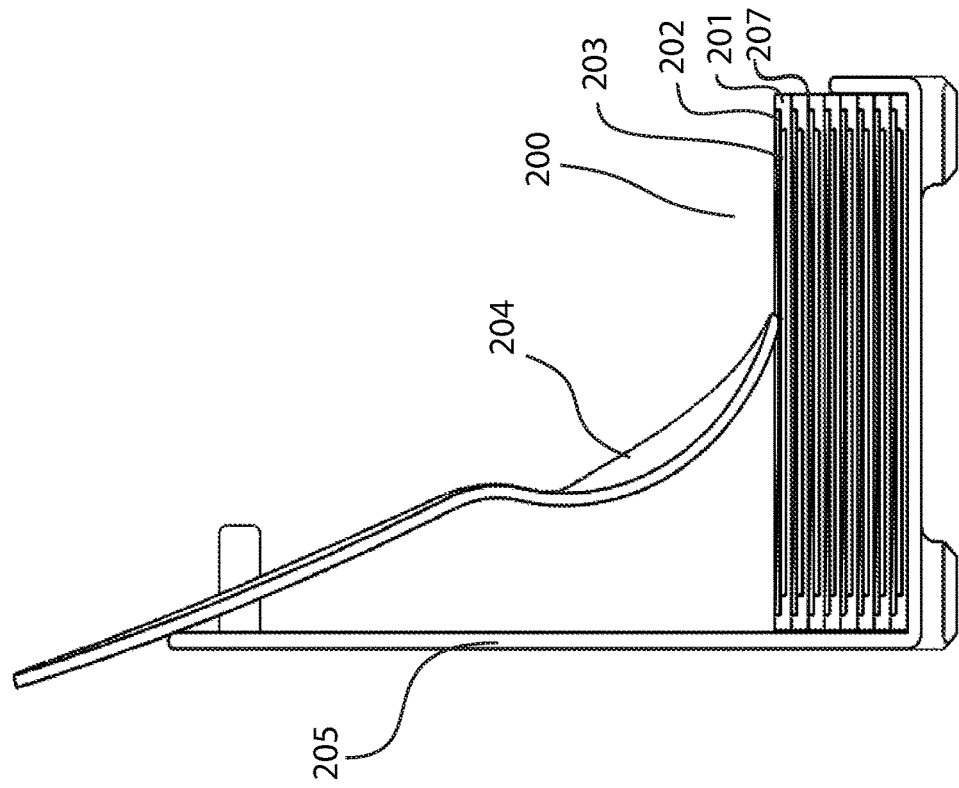
FIG. 8 shows an environmental and cross-sectional side view of an embodiment of the apparatus according to the present invention.

FIG. 8 shows a cross-sectional side view of the housing or dispensing structure 205 and showing the structure 205 supporting a utensil 204. Each of the units 200a in pad 200 may comprise of a base layer 201, top layer 202, and absorbent layer 203. The location 207 indicates the location of the adhesive applied to the rim of each of units in the pad 200. The adhesive utilized for joining each unit of the pad 200 may have sufficient strength to hold the units 200a together in the sanitation pad 200, while still allowing human user to peel the units 200a apart.

The figures provide an apparatus comprising of a plurality of units for preventing the spread of liquids and collecting debris, as well as providing a temporary support for utensils and tooling that include utilizing such apparatus. It should also be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. An apparatus for collecting liquid and preventing the spread of debris comprising a plurality of absorbent, removable, disposable units, the apparatus comprising:
   a. a sanitation pad formed of said plurality of absorbent and removable units operable for supporting a utensil, said units each including
      i. an absorbent layer operable for collecting liquid from said tool or utensil;
      ii. a base layer that is impermeable to water adjacent to said absorbent layer, wherein said base layer includes a vertical rim that surround the lateral edge of the absorbent layer along its perimeter such that the absorbent layer is nested in said base layer and said base layer confines liquid within said perimeter in part by the vertical rim, wherein an upper surface of said absorbent layer is flush with said vertical rim; and
      iii. an attachment mechanism operable to attach said base layer and said absorbent layer.

2. The apparatus of claim 1, wherein said absorbent layer may include a plurality of materials, including a liquid permeable top surface and an interior liquid absorbing material.

3. The apparatus of claim 1, wherein said liquid includes polar and nonpolar liquids.

4. The apparatus of claim 1, wherein said attachment mechanism includes an adhesive insoluble to polar liquids.

5. The apparatus of claim 1, wherein said attachment mechanism includes textile stitching.

6. The apparatus of claim 1, wherein said base layer and said absorbent layer comprise a biodegradable material.

7. The apparatus of claim 1, further comprising an adhesive operable to attach said plurality of units together to form said sanitation pad.

8. The apparatus of claim 1, an implement stand having a vertical receiver for propping an implement over said sanitation pad and a well located below the vertical receiver for holding said sanitation pad, such that the plurality of absorbent, disposable, and removable units are nested in said well.

9. An apparatus for collecting liquid and preventing the spread of debris comprising a plurality of absorbent and disposable units, comprising:
   a. a sanitation pad formed of a plurality of absorbent and removable units operable for supporting an instrument, each unit including:
      i. a top layer operable for collecting debris and allowing the permeation of liquid;
      ii. an absorbent layer operable for collecting liquid from said instrument;
      iii. a base layer operable to nest said top layer and said absorbent layer, wherein said base layer includes a plurality of sublayers including a hydrophobic layer and a vertical rim that surrounds the perimeter of said absorbent layer such that the absorbent layer is nested in said base layer and said base layer confines said liquid within the bounds of said perimeter in part by the vertical rim, wherein an upper surface of said absorbent layer is flush with said vertical rim; and
      iv. an adhesive operable to join said units to form said sanitation pad;
   b. an implement stand having a vertical receiver for propping an implement over said sanitation pad and a well located below the vertical receiver for holding said plurality of absorbent and removable units, such that the plurality of absorbent and removable units are nested in said well.

10. The apparatus of claim 9, wherein said instrument includes handheld tools, and utensils.

11. The apparatus of claim 9, wherein said liquid includes polar and nonpolar liquids.

12. The apparatus of claim 9, wherein unit is comprised of a biodegradable material.

13. The apparatus of claim 9, wherein said base layer includes said hydrophobic layer, a thin layer of liquid-impermeable plastic, and an adhesive base layer.

14. An apparatus operable to receive a sanitation pad, support a tool or utensil, and constructed to rest on a surface, comprising of:
   a. a base structure impermeable to water for placement on a surface; and
   b. a plurality of absorbent, disposable, and removable units connected together in a stack structure, wherein said units each comprise:
      i. an absorbent layer operable support said tool or utensil and absorb liquids and debris from said tool or utensil, wherein said absorbent layer may include a composite of materials, wherein said composite includes a top layer of a coarse fibrous material that traps debris on the surface of the sanitation pad, but is liquid permeable and allows for liquids to reach an underlying layer operable to absorb said liquids;
      ii. a base layer impermeable to water, wherein said base layer includes a vertical rim that surrounds the perimeter of said absorbent layer such that the absorbent layer is nested in said base layer and said base layer confines said liquid within the bounds of said perimeter in part by the vertical rim; and
      iii. an adhesive operable to attach said plurality of units together to form a vertical stack of units,
      wherein said base structure includes a cavity operable to nest said sanitation pad, wherein said cavity has an interior shape complementary to said sanitation pad.

15. The apparatus of claim 14, wherein an upper surface of said absorbent layer is flush with said vertical rim.

16. The apparatus of claim 14, wherein said liquid includes polar and nonpolar liquids.

17. The apparatus of claim 14, wherein said attachment mechanism may include an adhesive that is insoluble to polar liquids.

18. The apparatus of claim 14, wherein said base layer includes a plurality of sublayers including said hydrophobic layer, a thin layer of liquid-impermeable plastic, and an adhesive base layer.

19. The apparatus of claim 14, an implement stand having a vertical receiver for propping an implement over said sanitation pad and a well located below the vertical receiver for holding said sanitation pad, and removable units, such that the plurality of absorbent, disposable, and removable units are nested in said well.

* * * * *